(12) United States Patent
Wierich et al.

(10) Patent No.: US 10,401,621 B2
(45) Date of Patent: Sep. 3, 2019

(54) DISPLAY UNIT FOR VEHICLE HEAD-UP DISPLAY SYSTEM

(71) Applicant: MAGNA ELECTRONICS INC., Auburn Hills, MI (US)

(72) Inventors: Thomas Wierich, Butzbach (DE); Christian Weber, Karlsbad (DE); Michael Junglas, Elsenfeld (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 185 days.

(21) Appl. No.: 15/484,293

(22) Filed: Apr. 11, 2017

(65) Prior Publication Data

US 2017/0299861 A1 Oct. 19, 2017

Related U.S. Application Data

(60) Provisional application No. 62/352,585, filed on Jun. 21, 2016, provisional application No. 62/324,566, filed on Apr. 19, 2016.

(51) Int. Cl.

| | |
|---|---|
| *G02B 27/01* | (2006.01) |
| *G06F 3/01* | (2006.01) |
| *B60R 1/00* | (2006.01) |
| *G02B 17/06* | (2006.01) |
| *G02B 19/00* | (2006.01) |

(52) U.S. Cl.
CPC ............ *G02B 27/0101* (2013.01); *B60R 1/00* (2013.01); *G02B 17/0621* (2013.01); *G02B 19/0014* (2013.01); *G02B 19/0061* (2013.01); *G06F 3/013* (2013.01); *B60R 2300/205* (2013.01); *B60R 2300/308* (2013.01); *G02B 2027/0187* (2013.01)

(58) Field of Classification Search
CPC ............ G02B 27/0101; G02B 19/0014; G02B 17/0621; G02B 19/0061; G02B 2027/0187
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,201,565 | B1 | 3/2001 | Balogh |
| 6,999,071 | B2 | 2/2006 | Balogh |
| 7,043,056 | B2 | 5/2006 | Edwards et al. |
| 7,253,723 | B2 | 8/2007 | Lindahl et al. |
| 7,331,671 | B2 | 2/2008 | Hammoud |
| 7,460,693 | B2 | 12/2008 | Loy et al. |
| 7,572,008 | B2 | 8/2009 | Elvesjo et al. |
| 7,653,213 | B2 | 1/2010 | Longhurst et al. |

(Continued)

FOREIGN PATENT DOCUMENTS

| | | |
|---|---|---|
| DE | 102013206614 A1 | 10/2014 |
| WO | 2014204794 A1 | 12/2014 |

*Primary Examiner* — Joseph P Martinez
(74) *Attorney, Agent, or Firm* — Honigman LLP

(57) ABSTRACT

A display system for a vehicle includes a head-up display unit operable to display, at a display area at a windshield of the vehicle, information that is viewable by a driver of the vehicle when the driver is normally operating the vehicle. The head-up display unit includes a Köhler illuminator having a light source and an optical element. A reconfigurable mask is backlit by Köhler illumination generated by the Köhler illuminator.

19 Claims, 8 Drawing Sheets

(56) References Cited

U.S. PATENT DOCUMENTS

| | | |
|---|---|---|
| 7,855,755 B2 | 12/2010 | Weller et al. |
| 7,914,187 B2 | 3/2011 | Higgins-Luthman et al. |
| 8,066,375 B2 | 11/2011 | Skogo et al. |
| 8,120,577 B2 | 2/2012 | Bouvin et al. |
| 8,165,347 B2 | 4/2012 | Heinzmann et al. |
| 8,185,845 B2 | 5/2012 | Bjorklund et al. |
| 8,220,926 B2 | 7/2012 | Blixt et al. |
| 8,314,707 B2 | 11/2012 | Kobetski et al. |
| 8,339,446 B2 | 12/2012 | Blixt et al. |
| 8,342,687 B2 | 1/2013 | Blixt et al. |
| 8,427,751 B2 | 4/2013 | Rumpf et al. |
| 8,521,411 B2 | 8/2013 | Grabowski et al. |
| 8,562,136 B2 | 10/2013 | Blixt et al. |
| 8,610,768 B2 | 12/2013 | Holmberg et al. |
| 8,953,247 B2 | 2/2015 | Rumpf et al. |
| 9,405,120 B2 | 8/2016 | Graf et al. |
| 9,551,867 B1 | 1/2017 | Grabowski et al. |
| 10,017,114 B2 | 7/2018 | Bongwald |
| 2003/0169907 A1 | 9/2003 | Edwards et al. |
| 2004/0193371 A1 | 9/2004 | Koshiji et al. |
| 2006/0274973 A1 | 12/2006 | Mohamed et al. |
| 2007/0014916 A1 | 1/2007 | Daniels |
| 2007/0297692 A1 | 12/2007 | Hamatani et al. |
| 2008/0077882 A1 | 3/2008 | Kramer et al. |
| 2009/0304232 A1 | 12/2009 | Tsukizawa |
| 2010/0097580 A1 | 4/2010 | Yamamoto et al. |
| 2012/0093358 A1 | 4/2012 | Tschirhart |
| 2012/0154591 A1 | 6/2012 | Baur et al. |
| 2013/0028588 A1 | 1/2013 | Suman et al. |
| 2013/0050258 A1 | 2/2013 | Liu et al. |
| 2013/0229523 A1 | 9/2013 | Higgins-Luthman et al. |
| 2013/0285053 A1 | 10/2013 | Kawashima et al. |
| 2014/0062946 A1 | 3/2014 | Graumann et al. |
| 2014/0063359 A1 | 3/2014 | Chen |
| 2014/0072230 A1 | 3/2014 | Ruan et al. |
| 2014/0139655 A1 | 5/2014 | Mimar |
| 2014/0218529 A1 | 8/2014 | Mahmoud et al. |
| 2014/0247352 A1 | 9/2014 | Rathi et al. |
| 2014/0300739 A1 | 10/2014 | Mimar |
| 2014/0300830 A1 | 10/2014 | Wang |
| 2014/0336876 A1 | 11/2014 | Gieseke et al. |
| 2015/0009010 A1 | 1/2015 | Biemer |
| 2015/0022664 A1 | 1/2015 | Pflug et al. |
| 2015/0092042 A1 | 4/2015 | Fursich |
| 2015/0145995 A1 | 5/2015 | Shahraray et al. |
| 2015/0156383 A1 | 6/2015 | Biemer et al. |
| 2015/0158499 A1 | 6/2015 | Koravadi |
| 2015/0185834 A1 | 7/2015 | Wingrove et al. |
| 2015/0232030 A1 | 8/2015 | Bongwald |
| 2015/0294148 A1 | 10/2015 | Mohanakrishnan et al. |
| 2015/0294169 A1 | 10/2015 | Zhou et al. |
| 2015/0296135 A1 | 10/2015 | Wacquant et al. |
| 2016/0029111 A1 | 1/2016 | Wacquant et al. |
| 2016/0044284 A1 | 2/2016 | Goseberg et al. |
| 2016/0065921 A1* | 3/2016 | Sieler .................. G03B 21/001 348/757 |
| 2016/0137126 A1 | 5/2016 | Fursich et al. |
| 2016/0148062 A1 | 5/2016 | Fursich |
| 2016/0209647 A1 | 7/2016 | Fursich |
| 2017/0153457 A1 | 6/2017 | Kunze |
| 2017/0235137 A1 | 8/2017 | Kunze |

\* cited by examiner

DISPLAY UNIT FOR VEHICLE HEAD-UP DISPLAY SYSTEM

CROSS REFERENCE TO RELATED APPLICATIONS

The present application claims the filing benefits of U.S. provisional application Ser. No. 62/352,585, filed Jun. 21, 2016, and Ser. No. 62/324,566, filed Apr. 19, 2016, which are hereby incorporated herein by reference in their entireties.

FIELD OF THE INVENTION

The present invention relates generally to a vehicle vision system for a vehicle and, more particularly, to a vehicle vision system that includes a display for displaying information to an occupant of a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Head-up displays are also known and may display video images or other information for viewing by the driver of the vehicle. Examples of known head-up displays are described in U.S. Publication No. US-2014-0063359 and DE Publication No. DE 10 2013 206 614, which are hereby incorporated herein by reference in their entireties.

SUMMARY OF THE INVENTION

The present invention provides a vision system or imaging system for a vehicle that includes a head-up display for displaying information to an occupant of a vehicle. The head-up display or monitor may be a component of a camera monitoring system (such as central review mirror replacement or side mirror replacement, surround and top view vision system or rear panorama vision system), or a component of a navigation system or infotainment system, or a component of an instrument and driving aid augmentation or the like. The head-up display unit comprises a Köhler light source comprising a light source and an optical element. A display screen of the head-up display unit is backlit by the Köhler light source and projects or displays information or video images for viewing by the driver or occupant of the vehicle, such as by the driver or occupant viewing towards and through the windshield of the vehicle or viewing a combiner at the dashboard of the vehicle or the like.

These and other objects, advantages, purposes and features of the present invention will become apparent upon review of the following specification in conjunction with the drawings.

LEGEND

Figure 1:
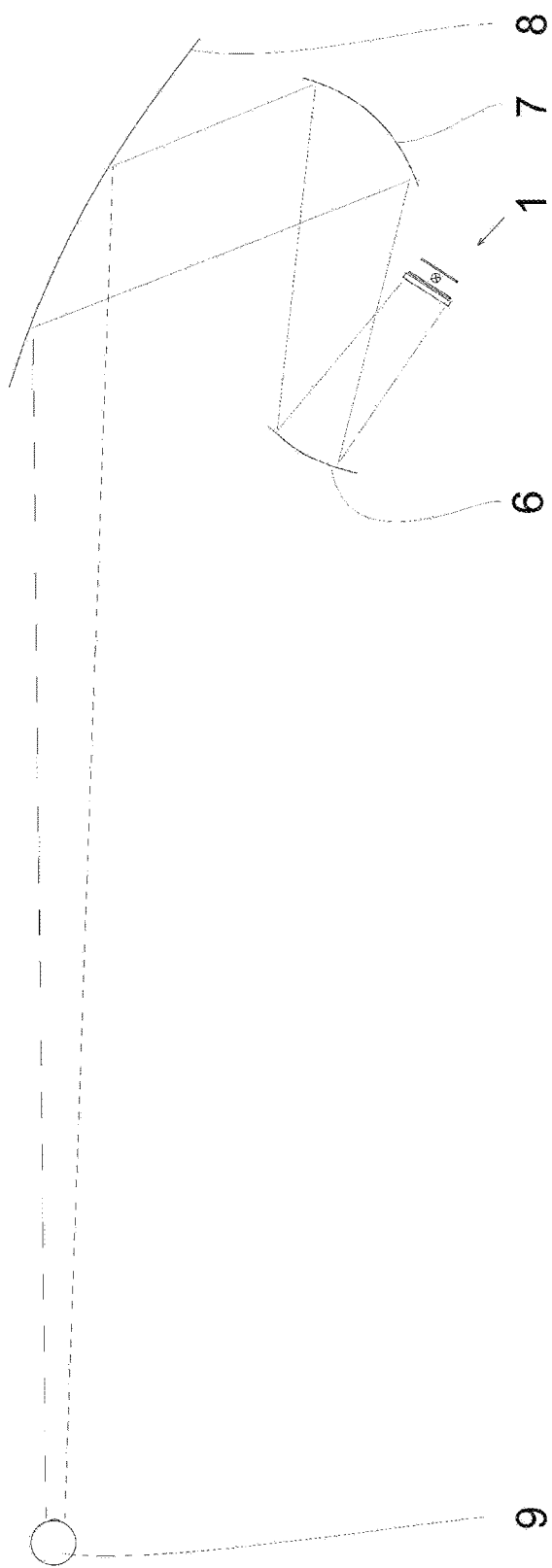
FIG. 1 is a schematic showing a known windshield head-up display system.

1 Display unit
2 Light source
3 Reflector
4 Diffusor
5 TFT
6 Folding mirror
7 Aspheric mirror
8 Windshield
9 Viewing driver or eye box
10 Display unit using a Köhler light source
11 Light source
12 Optical element
13 Condenser
14 TFT reconfigurable mask
15 Mirroring surface (towards the inside)
16 Front surface of optical element 12
17 Focus plane
18 Aperture Stop
19 Luminous-field diaphragm

DESCRIPTION OF THE PREFERRED EMBODIMENTS

There are different tasks and locations for monitors in a vehicle—monitors typically located at the dashboard, head unit or in the front seat's head rests are often used as infotainment displays, while monitors disposed at the windshield are often used as aftermarket navigation screens. OEM navigation system's monitors are often integrated into the head unit in the lower center, or on top of the dash board in the center. Head-up display systems may show navigation system information as well as forward vision driving warning and aiding information. There are some approaches to show forward vision scene augmentation. Vehicle cluster instruments are often done in augmented vision on displays. These displays may show different data individually when required. Vehicle camera vision often uses existing monitors or projectors for displaying camera images and overlays such as rear view camera and top view displaying as well as curb view and cross traffic view. Other applications require extra monitors or displays such as central rear view mirror replacing camera monitor systems or side mirror replacing rear and blind spot camera displays, such as by utilizing aspects of the systems described in International Publication No. WO 2014/204794, which is hereby incorporated herein by reference in its entirety.

As shown in FIG. 1, known automotive head-up displays (HUD) comprise a display unit 1, a folding mirror 6, a aspheric mirror and the vehicle windshield 8 a last reflective element before the emitted light reaches the driver's eyes. For the driver to see, his eyes need to stay in a region commonly referred to as a "head box," which is a position at which the virtual image is fully viewable or more precise the light path from the display to the viewing driver is given via all reflective elements. A common alternative vehicle head-up displays includes a combiner as the last reflective element instead of the windshield.

Figure 2:
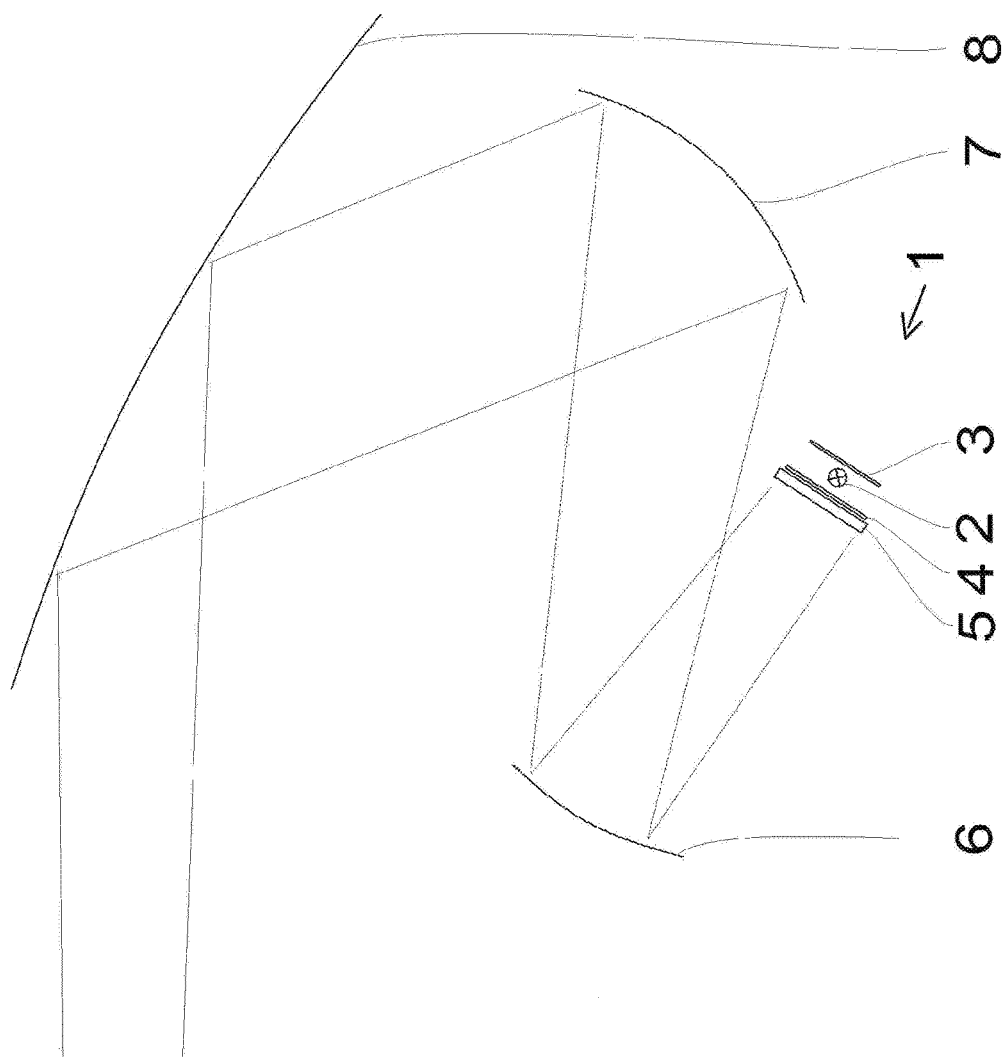
FIG. 2 is a schematic showing a close up to the display device of FIG. 1, having a diffusor element backlit within the light path, and with an optional reflector.

As shown in FIG. 2, known automotive head-up display's display units include a light source 2, an optional rear reflector 3, a diffusor 4 and a thin film transistor (TFT) display 5. The light source may include a Lambertian emitter or the like. The reflector may be shaped to reflect the light emitted to the rear towards the diffusor. Typically this backlighting does not achieve uniform light density. To cope with this, multiple light emitters are distributed behind the diffusor to even out. Diffusers are used to homogenize the illumination. Since the diffusor scatters the light it is directed to several directions, not distinctively towards the eye box. This reduces the light output of conventional HUDs. At conventional HUDs the light which is reaching the eye box is at about 1.5 percent of the light emitted by the LED light source 2.

The present invention provides a head-up display system that includes an optical element that is capable of directing more light of the LED backlighting towards the eye box and by that improving the light output. This is done by turning the LED backlighting of the display unit into a Köhler type illuminator (that generates Köhler illumination) and by that being able to renounce the diffusor element. A Köhler type illuminator is known from microscope's illumination.

Figure 3:
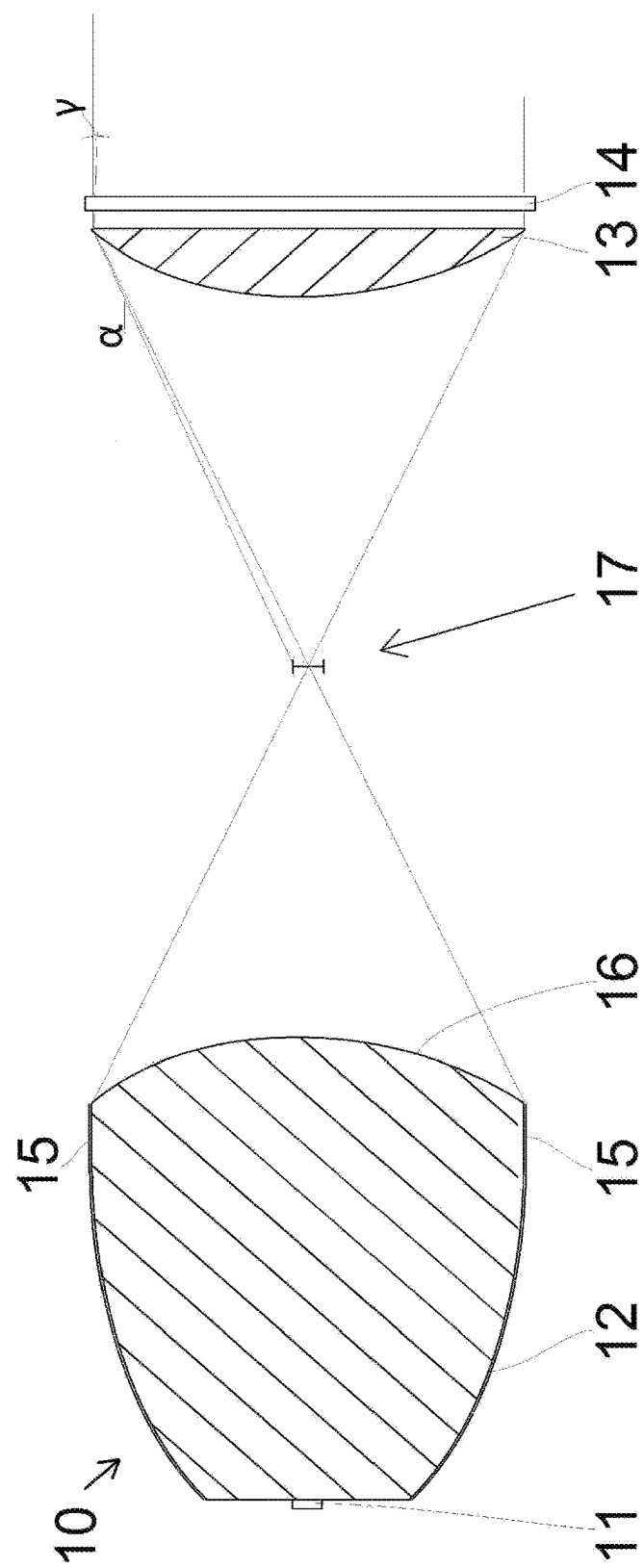
FIG. 3 is a head-up display unit with a TFT back light in accordance with the present invention.

The image of the light source is at infinity and thereby appearing maximally unsharp. As shown in FIG. 3, the display unit 10 uses a Köhler type illuminator and includes a light source 11 (such as a single light emitting diode or more than one light emitting diodes), an optical element 12, a condenser 13 and a TFT display or reconfigurable mask 14 (having a plurality of individually addressable pixels). Köhler illumination facilitates formation of an image of the light source used that is defocused in the sample plane and its conjugate image planes, and preferably utilizes a high density illumination source, a field diaphragm, a condenser diaphragm, and collector and condenser lenses.

Figure 4:
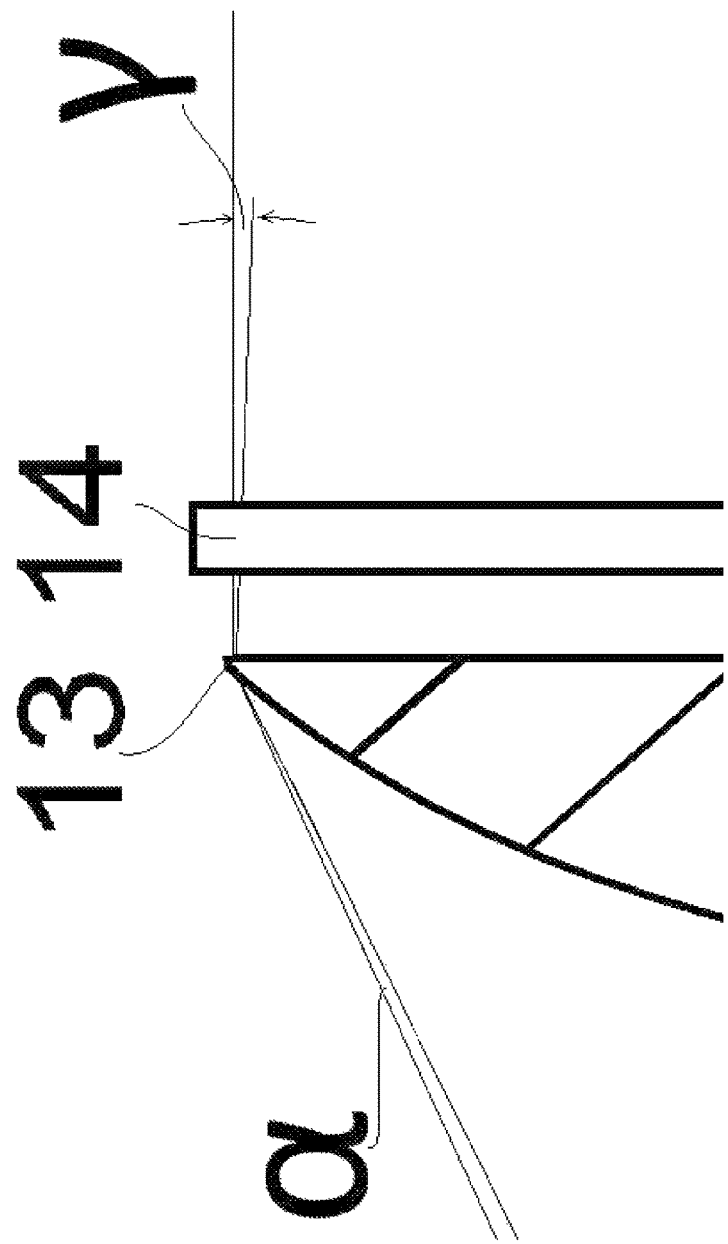
FIG. 4 is an enlarged view of a portion of the condenser and TFT of the head-up display unit of FIG. 3.
Figure 5:
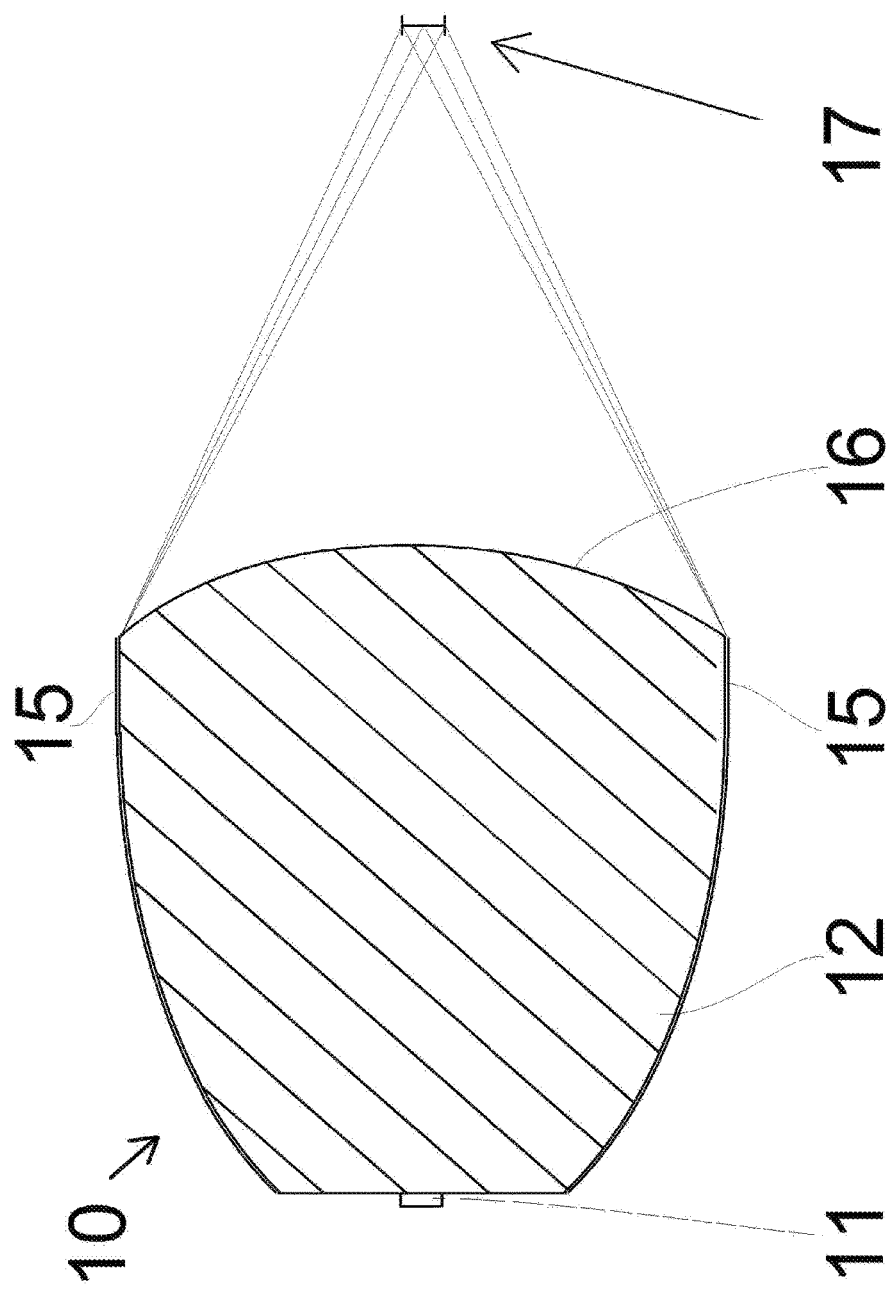
FIG. 5 is a view of the optical element of the head-up display unit of FIG. 3.

In the illustrated embodiment, the optical element 12 comprises a parabolic surface or element or part, which directs the emitted light parallel, and a collector optic as a unitary or common, solid, transparent body. The parabolic surface 15 of the optical element 12 is mirrored to reflect light incident thereon. By truncating the parabolic body at the rear and positioning the light source 11 at the parabola's focal point, an immersion optic is comprised. The light source 11 may comprise a Lambertian emitter. Some known LED types come close to Lambertian emitter properties, and thus the light source 11 may optionally comprise a LED. By these properties, the majority of the emitted light is parallelized before being focused to the plane 17 (the collector focus plane has an extension greater than 0, see FIG. 5) by the collector lens (the rear part of the optical element 12). The condenser lens 13 turns the light parallel again, but now with a certain NA, see FIG. 4. All light rays from the immersion optic may hit the collector optic. The expansion of the focus plane 17 in between 12 and 13 must have a specific size and aspect ratio for illuminating the eye box fully and must be in the focal distance of the condenser lens 13.

Figure 6:
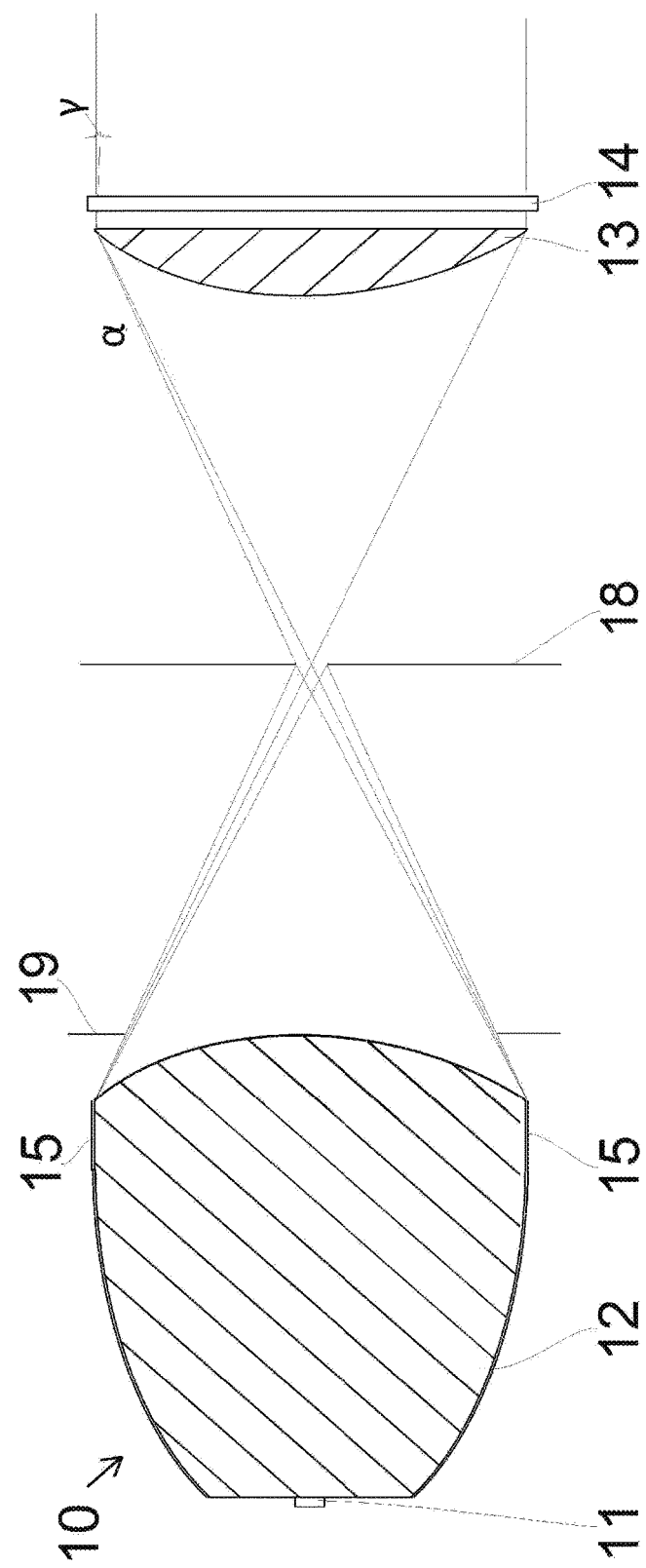
FIG. 6 is a head-up display unit with a TFT back light similar to the one shown in FIG. 3, with additionally having a Luminous-field diaphragm and an aperture stop.
Figure 7:
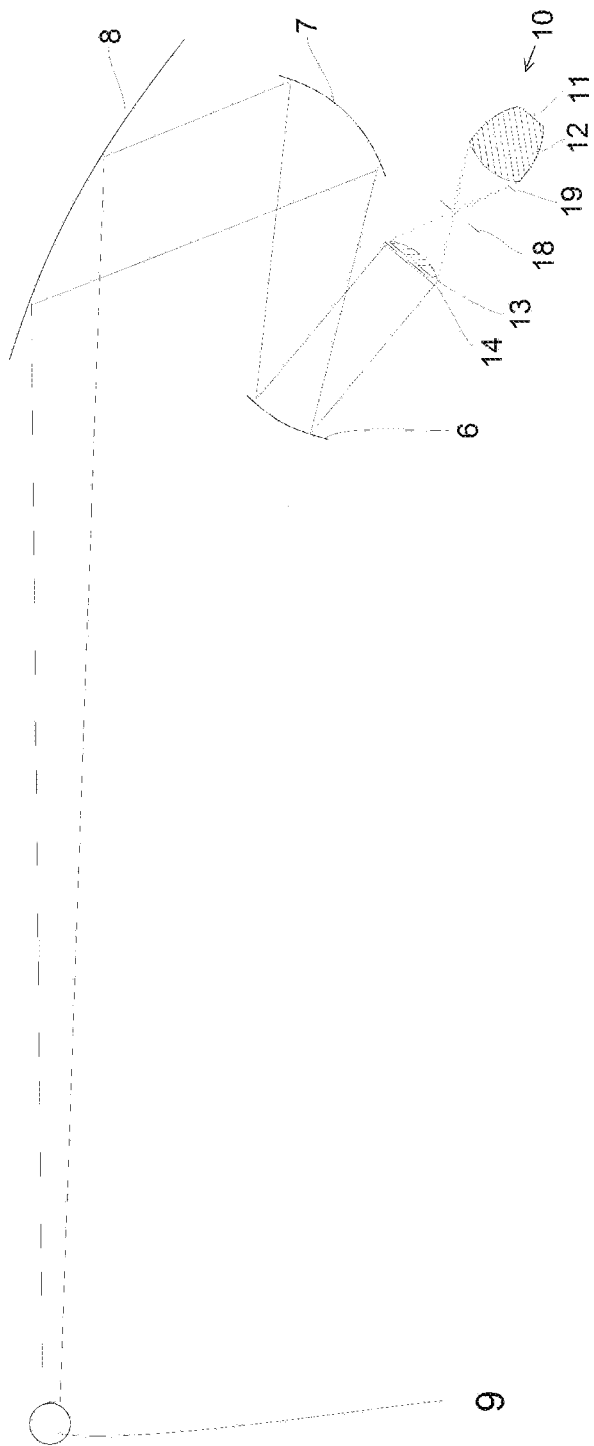
FIG. 7 is a schematic of a windshield head-up display system having a TFT back light illumination comprising a Köhler light source.
Figure 8:
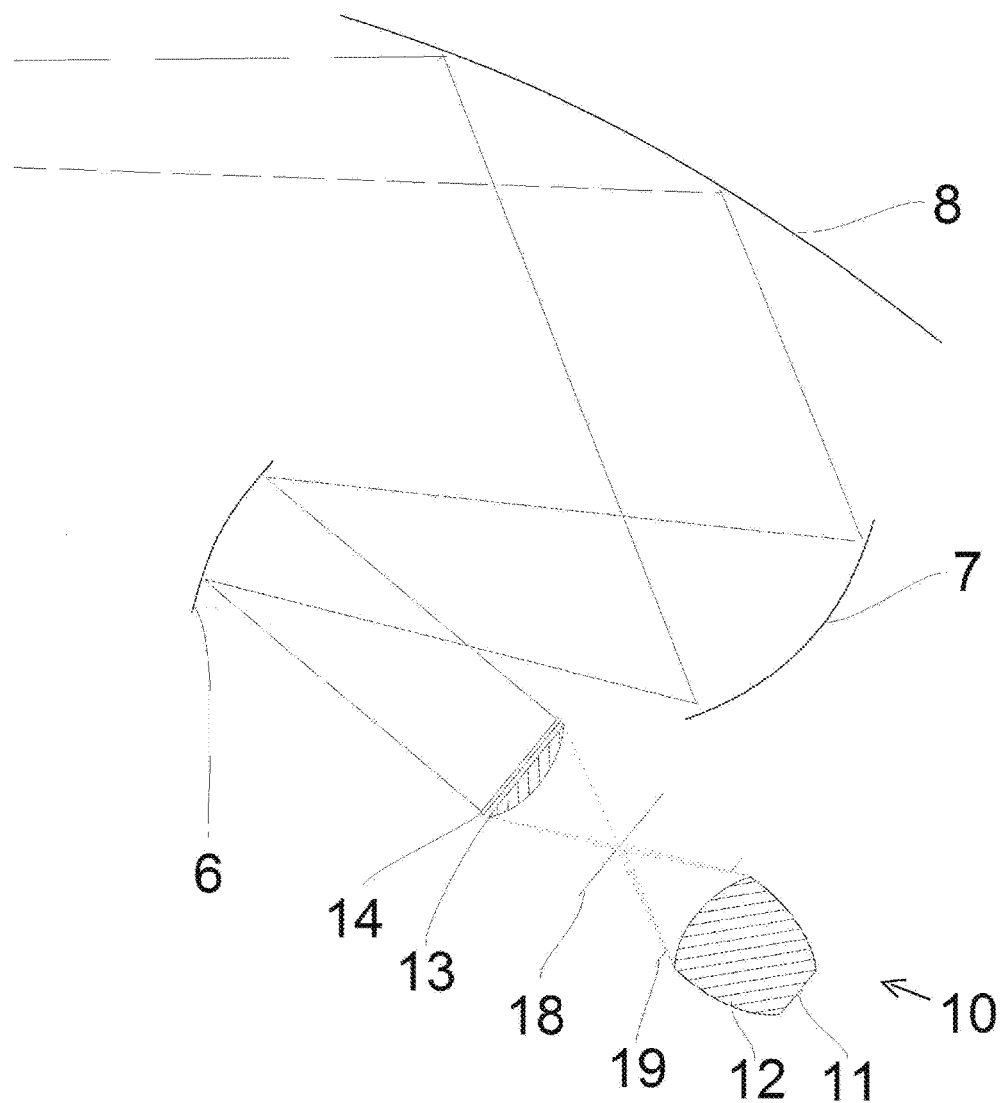
FIG. 8 is a schematic showing an enlarged view of the display device of FIG. 7, having a Köhler illuminator such as shown in FIG. 6 with no diffusor in the path of light.

FIG. 6 shows two additional stops, a luminous-field diaphragm 19 and an aperture stop 18. The luminous-field diaphragm limits the illumination to just the extension of the eye box (or the limit that the condenser lens can capture). The aperture stop 18 controls the NA independent from the luminous-field diaphragm. FIGS. 7 and 8 show the Köhler (back lighting) illuminator used in a windshield head up display system or assembly with both mirrors 6, 7, the windshield 8 and the (receiving) driver's eye(s) in the eye box 9. Optionally, the head up back light illumination may comprise two devices for illuminating two eye box TFTs when setting up a stereoscopic head up vision systems with divided light paths for both of the driver's eyes, such as by utilizing aspects of the systems described in U.S. patent application Ser. No. 15/364,354, filed Nov. 30, 2016, and published on Jun. 1, 2017 as U.S. Patent Publication No. US-2017-0153457, which is hereby incorporated herein by reference in its entirety.

To achieve the optical properties of the collector lens surface 16, the optical element 12 optionally may have an optical substructure or sub-optical structure such as a micro lens pattern, a Fresnel lens pattern or a pattern of ripples, grooves or bumps. The mirrored surfaces 15 of the optical element 12 optionally may have an uneven or rough (still mirroring) surface structure or pattern or may have a surface with ripples, facets, grooves or bumps. Optionally, the mirroring surfaces 15 have structured intermittents.

Therefore, the display system comprises a Köhler illuminator that emits Köhler illumination to and through a reconfigurable mask that is backlit by the Köhler illumination generated by the Köhler illuminator. The optical element and Köhler illuminator operate to evenly backlight the reconfigurable mask. In the illustrated embodiment, the optical element comprises a truncated parabolic transparent element (such as formed of an acrylic or glass or polycarbonate material or the like) with its truncated end being through the focal point of the parabola defined by the reflective parabolic surfaces of the body or element. Light emitted by the light source at the focal point is reflected by the reflective parabolic surfaces so as to be parallel rays of light reflected toward the opposite end of the body or element (the front surface or end, with the light source disposed at the rear surface or end). The light rays are focused by the curved collector surface at the front end of the element and are focused toward a focal plane. The immersion optic lens element thus comprises a parabolic reflector combined with a collector optic as a common, solid, transparent body. The focused light passes through the focal plane and is received by a condenser optic, which parallelizes the light rays, such that the generally parallel light rays exiting the opposite side of the condenser optic (opposite from the side that faces the focal plane and truncated parabolic body or element) are received by the reconfigurable mask or display element. The reconfigurable mask is thus backlit via uniform light received from the condenser optic. The display system may also include a diffusor, such that light is not lost, with the light rays substantially or mostly directed to the driver's eyebox.

The display system of the present invention may utilize aspects of the display systems described in U.S. Pat. No. 7,855,755 and/or International Publication No. WO 1998/034411; WO 2001/088598; WO 2013/162977 and/or WO 2005/121707 and/or U.S. Publication Nos. US-2016-0209647; US-2015-0092042; US-2015-0232030 and/or US-2015-0296135, and/or U.S. patent application Ser. No. 15/364,354, filed Nov. 30, 2016, and published on Jun. 1, 2017 as U.S. Patent Publication No. US-2017-0153457, which are hereby incorporated herein by reference in their entireties. Optionally, the head-up display may display a seamless side-rear view panorama image generated (in real time) by morphing and stitching images from the vehicle side cameras and images from the vehicle rear camera, where the rear vision may be produced in 2D or 3D by multiple cameras utilizing aspects of the systems described in U.S. Publication Nos. US-2016-0044284; US-2016-0148062 and/or US-2015-0232030 which are hereby incorporated herein by reference in their entireties. Optionally, the acoustics virtual source may also be controlled to follow simultaneously with the image presented by the individual light field monitor to the individual passenger such as by utilizing aspects of the systems described in U.S. Publication No. US-2016-0029111, which is hereby incorporated herein by reference in its entirety. Optionally, a side camera's combined rear and blind spot view, such as by utilizing aspects of the systems described in the above incorporated International Publication No. WO 2014/204794, which is hereby incorporated herein by reference in its entirety, may be displayed.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640x480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the video display may utilize aspects of the display devices described in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display may be disposed behind a mirror reflective element so as to be viewable through the reflective element when the display is activated to display information. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A display system for a vehicle, said display system comprising:
   a head-up display unit operable to display, at a display area at a windshield of the equipped vehicle, information that is viewable by a driver of the equipped vehicle when the driver is normally operating the equipped vehicle;
   wherein said head-up display unit comprises a Köhler illuminator comprising a light source and an optical element, and wherein a reconfigurable mask is backlit by Köhler illumination generated by said Köhler illuminator; and
   wherein said optical element comprises a solid transparent truncated parabolic body having reflective parabolic surfaces, and wherein said truncated parabolic body is truncated through a focal point of the parabola defined by the parabolic surfaces, and wherein said light source is disposed at the truncated end of said truncated parabolic body so as to be disposed at the focal point.

2. The display system of claim 1, wherein said reconfigurable mask comprises a thin film transistor liquid crystal reconfigurable mask comprising a plurality of individually addressable pixel elements.

3. The display system of claim 1, wherein said optical element of said Köhler illuminator comprises a solid immersion optic.

4. The display system of claim 3, wherein said light source comprises a light emitting diode.

5. The display system of claim 3, wherein said optical element comprises a parabolic surface that directs light emitted by said light source to parallel light rays.

6. The display system of claim 3, wherein said optical element comprises a collector optic.

7. The display system of claim 1, wherein light reflected from said parabolic surfaces of said truncated parabolic body is parallelized.

8. The display system of claim 7, wherein a surface of said truncated parabolic body opposite said light source comprises a collector optic surface, and wherein said collector optic surface focuses the reflected light toward a focal plane, and wherein said display system comprises a condenser optic that receives light passing through the focal plane and parallelizes the light passing through said condenser optic so that parallel light rays are received at said reconfigurable mask.

9. The display system of claim 1, wherein Köhler illumination generated by said Köhler illuminator provides uniform backlighting of said reconfigurable mask.

10. The display system of claim 1, comprising a gaze monitor operable to determine a gaze of the driver of the equipped vehicle, and wherein said head-up display unit is controlled responsive at least in part to a determined gaze of the driver as determined by said gaze monitor.

11. The display system of claim 1, comprising at least one camera configured to be disposed at the equipped vehicle so as to have a respective field of view exterior of the equipped vehicle, and wherein, with said at least one camera disposed at the equipped vehicle, said head-up display unit is operable to display images derived from image data captured by said at least one camera.

12. The display system of claim 1, wherein said head-up display unit is disposed at or in an instrumental panel of the equipped vehicle and projects images onto one of (i) the windshield of the equipped vehicle and (ii) a combiner disposed on top of a dashboard of the equipped vehicle and viewable by the driver of the equipped vehicle.

13. A display system for a vehicle, said display system comprising:
   a head-up display unit operable to display, at a display area at a windshield of the equipped vehicle, information that is viewable by a driver of the equipped vehicle when the driver is normally operating the equipped vehicle;
   wherein said head-up display unit comprises a light source, a parabolic optical element, a condenser optic and a reconfigurable mask;
   wherein said parabolic optical element comprises a solid transparent truncated parabolic body having a rear end and a front end and side reflective parabolic surfaces, and wherein said truncated parabolic body is truncated through a focal point of the parabola defined by the parabolic surfaces to establish the rear end of said truncated parabolic body;
   wherein said light source is disposed at the rear end of said truncated parabolic body so as to be disposed at the focal point;
   wherein a collector optic is at the front end of said truncated parabolic body;
   wherein light emitted by said light source is reflected from said parabolic surfaces of said truncated parabolic body as parallel light rays and wherein the parallel light rays are focused by said collector optic toward a focal plane; and
   wherein said condenser optic receives light passing through the focal plane and parallelizes the light passing through said condenser optic so that parallel light rays are received at said reconfigurable mask to backlight said reconfigurable mask.

14. The display system of claim 13, wherein said reconfigurable mask comprises a thin film transistor liquid crystal reconfigurable mask comprising a plurality of individually addressable pixel elements.

15. The display system of claim 13, wherein said parabolic optical element and said light source and said condenser optic function as a Köhler illuminator to provide Köhler illumination at said reconfigurable mask.

16. The display system of claim 13, wherein said light source comprises a light emitting diode.

17. The display system of claim 13, wherein illumination generated by said light source, said parabolic optical element, and said condenser optic provides uniform backlighting of said reconfigurable mask.

18. A display system for a vehicle, said display system comprising:
   a head-up display unit operable to display, at a display area at a windshield of the equipped vehicle, information that is viewable by a driver of the equipped vehicle when the driver is normally operating the equipped vehicle;
   wherein said head-up display unit comprises a Köhler illuminator comprising a light emitting diode and an optical element, and wherein a reconfigurable mask is backlit by Köhler illumination generated by said Köhler illuminator;
   wherein said reconfigurable mask comprises a thin film transistor liquid crystal reconfigurable mask comprising a plurality of individually addressable pixel elements;

wherein said optical element of said Köhler illuminator comprises a solid immersion optic, and wherein said optical element comprises a transparent parabolic body having a parabolic surface that directs light emitted by said light emitting diode to parallel light rays, and wherein said parabolic body is truncated through a focal point of the parabola defined by the parabolic surface, and wherein said light emitting diode is disposed at the truncated end of said parabolic body so as to be disposed at the focal point;

wherein said reconfigurable mask is uniformly backlit by parallel light rays; and wherein said head-up display unit is disposed at or in an instrumental panel of the equipped vehicle and projects images onto one of (i) the windshield of the equipped vehicle and (ii) a combiner disposed on top of a dashboard of the equipped vehicle and viewable by the driver of the equipped vehicle.

19. The display system of claim 18, wherein said optical element comprises a collector optic surface, and wherein said collector optic surface focuses parallel light rays toward a focal plane, and wherein said display system comprises a condenser optic that receives light passing through the focal plane and parallelizes the light passing through said condenser optic so that said reconfigurable mask is uniformly backlit by parallel light rays that pass through said condenser optic.

* * * * *